United States Patent

[11] 3,594,876

| [72] | Inventor | Conrad J. Gunther |
| | | Uniondale, N.Y. |
| [21] | Appl. No. | 866,698 |
| [22] | Filed | Oct. 15, 1969 |
| [45] | Patented | July 27, 1971 |
| [73] | Assignee | Dzus Fastener Co., Inc. |
| | | West Islip, N.Y. |

[54] FASTENER HAVING IMPROVED LOAD-CARRYING CAPACITY
11 Claims, 12 Drawing Figs.

[52] U.S. Cl. .................................................. 24/221
[51] Int. Cl. ............................................... A44b 17/00
[50] Field of Search ........................................... 24/221, 221 A, 221 R, 221 K

[56] References Cited
UNITED STATES PATENTS

| 2,282,360 | 5/1942 | Horrocks | 24/221 R |
| 2,486,411 | 11/1949 | Huelster | 24/221 K |
| 2,614,306 | 10/1952 | Dzus | 24/221 R |
| 3,222,744 | 12/1965 | Dellith | 24/221 A |
| 3,495,307 | 2/1970 | Metz | 24/221 K |

*Primary Examiner*—Casmir A. Nunberg
*Assistant Examiner*—Garry Moore
*Attorney*—Kane, Dalsimer, Kane, Sullivan and Kurucz ABSTRACT: A fastener for substantially rigidly interengaging two members. A stud element is provided which is adapted to extend through an opening in one of the members to be fastened and has a cam slot adapted to engage a pin on the other of the members. The stud element is rotatable between an open and a closed position on the pin. A housing surrounds the upper part of the stud element in rotatable relationship therewith and is adapted to engage the surface of one of the members. The housing has surfaces thereon forming a slot in the wall thereof which is inclined with respect to the transverse axis of the housing. A bar extends laterally from the stud element through the slot and engages the slot forming surfaces of the housing. Means are provided for retaining the bar in the slot so that when the pin is in the closed position and the housing or stud are rotated relative to one another, the bar will shift in the slot from the relaxed position to a locked position and will be supported by a portion of the slot forming surfaces while in the locked position to thereby increase the load-carrying capacity of the fastener.

PATENTED JUL 27 1971 3,594,876

INVENTOR
CONRAD J. GUNTHER
BY
Kane, Dalsimer, Kane, Sullivan & Kurucz
ATTORNEYS

FIG. 4
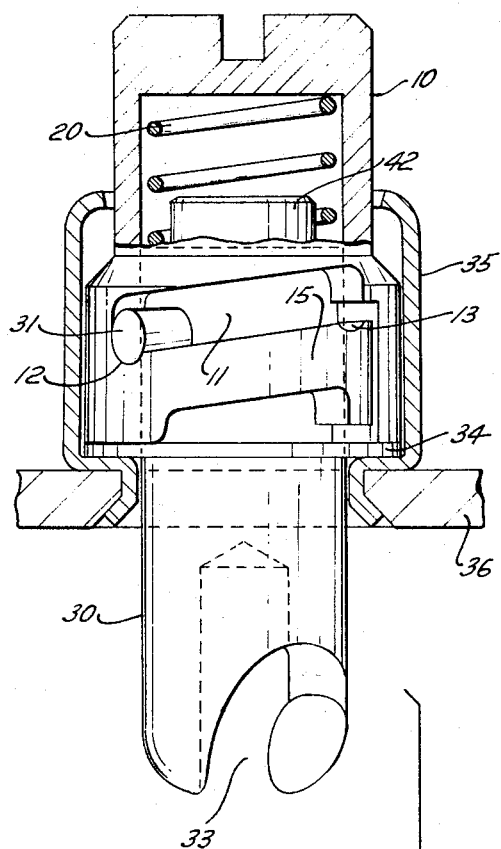
FIG. 5
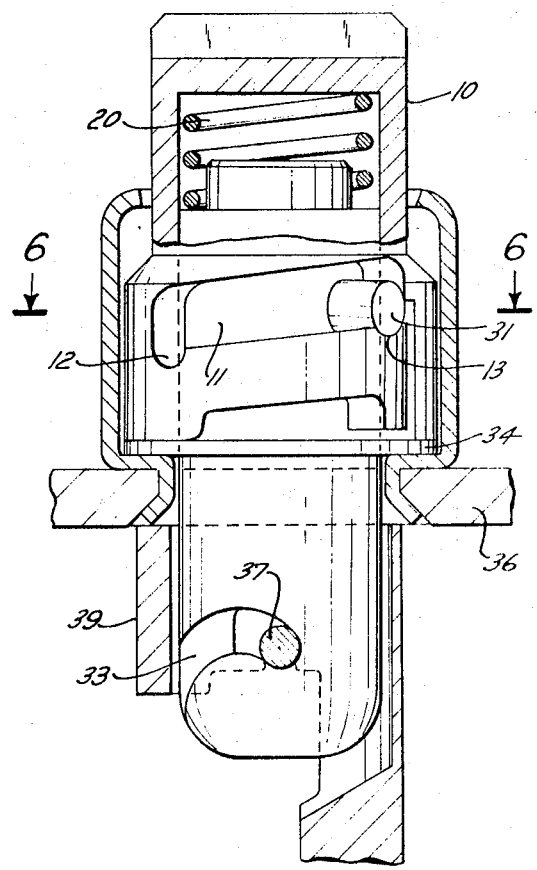
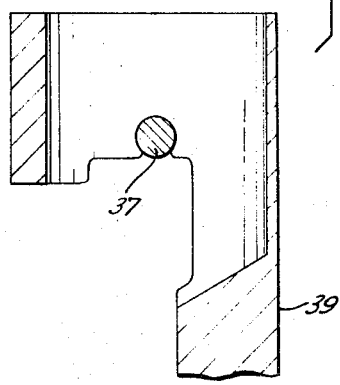
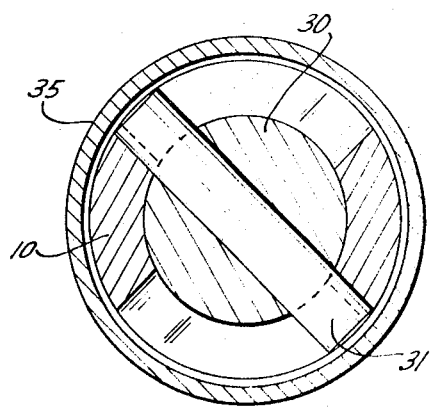
FIG. 6
INVENTOR
CONRAD J. GUNTHER
BY
ATTORNEYS

FIG. 7
FIG. 8
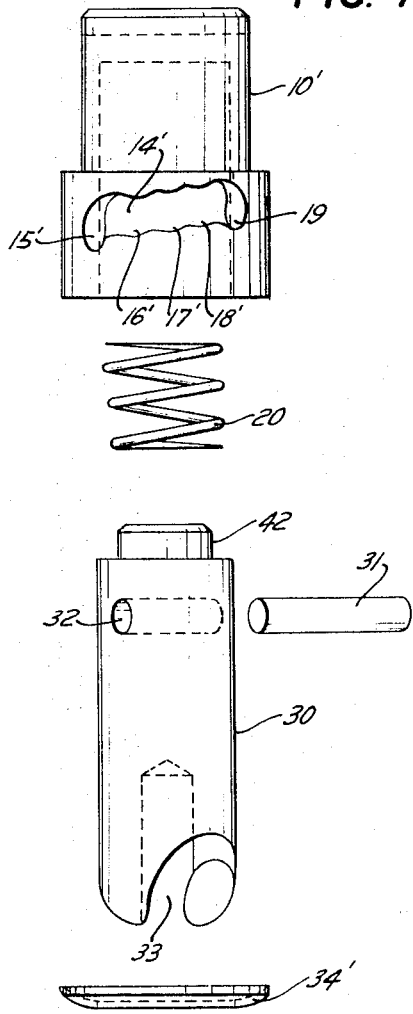
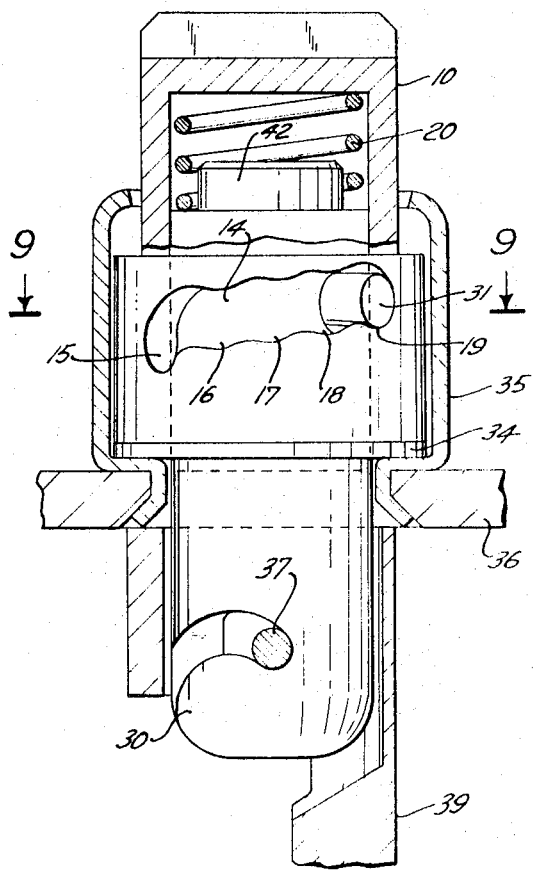
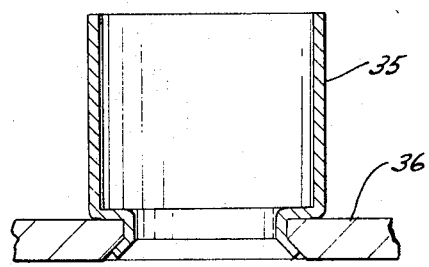
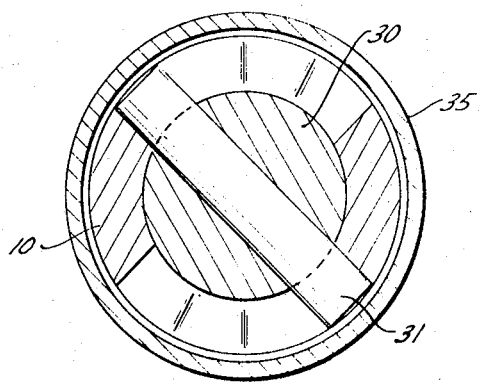
FIG. 9
INVENTOR
CONRAD J. GUNTHER
BY
ATTORNEYS

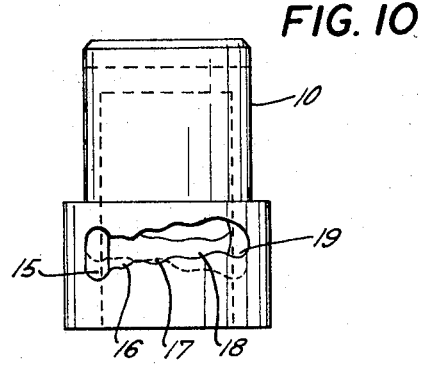
FIG. 10
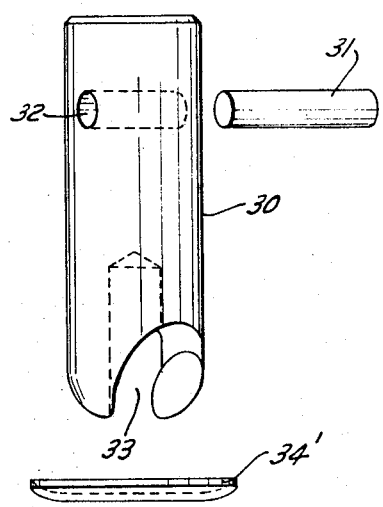
FIG. 11
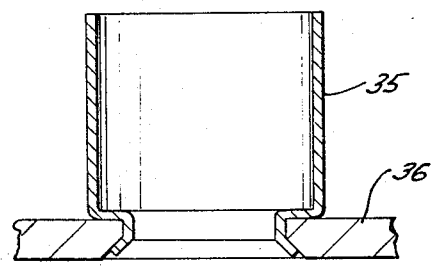
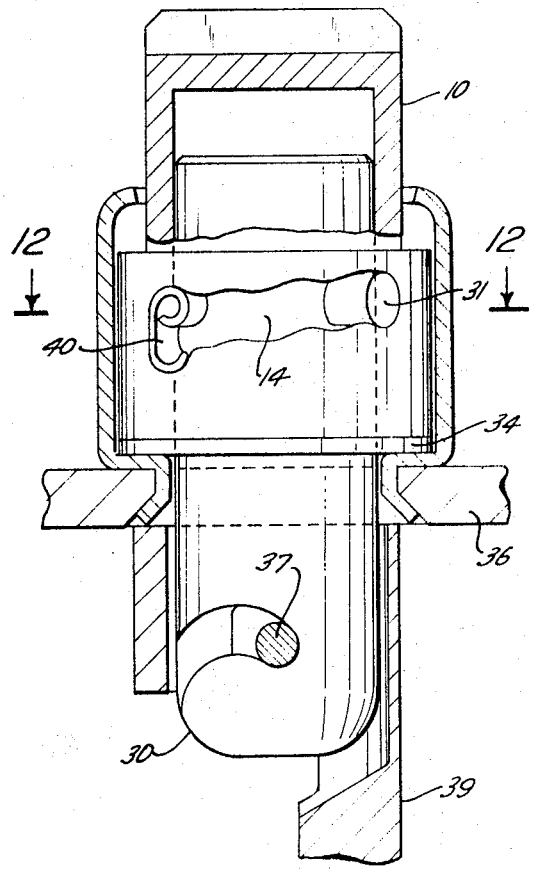
FIG. 12
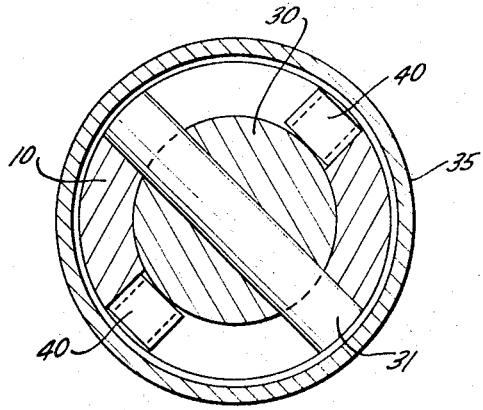
INVENTOR
CONRAD J. GUNTHER
BY
ATTORNEYS 3,594,876

FASTENER HAVING IMPROVED LOAD-CARRYING CAPACITY

BACKGROUND OF THE INVENTION

The load-carrying capacity of fastening devices similar to those shown in Dzus U.S. Pat. No. 2,337,457, is generally limited by the capacity of the spring which urges the coupling elements into engagement. The force exerted on the panel mounted pin by the stud element is limited by the size of the spring interposed between the pin and stud element. For many applications, this is quite acceptable, however, there are certain instances where it is desirable to have a more rigid fastening member and one which will withstand greater loads.

Furthermore, under certain circumstances, the attached panels may become exposed to excessive vibration and when common types of spring-loaded fasteners such as those described in the above-mentioned patent are employed, excessive wear may occur on the panels at the point of attachment. This excessive wear has a deleterious effect on the attached panel arrangement such that the panels may become loose or damaged in other ways. Naturally, this is extremely undesirable in the art and, therefore, under the conditions discussed above, a fastener which would specifically overcome the discussed problems would be extremely advantageous.

SUMMARY OF THE INVENTION

With the above in mind, among the primary objectives of the invention are to provide a fastener assembly capable of handling increased loads placed upon panels or other members joined by the fastener, and which will prevent excessive wear about the point through which it is inserted in a panel subjected to a large amount of vibration.

The fastener is designed for substantially rigidly engaging two members and includes a stud element adapted to extend through an opening in one of the members and having a cam slot adapted to engage a pin in the other of the members. The stud element is rotatable between an open and closed position on the pin. A housing surrounds the upper part of the stud element in rotatable relationship therewith and is adapted to engage the surface of the one member distal from the other member when the cam slot is engaged with the pin. The housing has surfaces thereon forming a slot in the wall thereof inclined with respect to the transverse axis of the housing. A bar extends laterally from the stud element through the slot and engages the slot forming surfaces of the housing. Finally, means are provided for retaining the bar in the slot so that when the pin is in the closed position in the cam slot and the housing or stud are rotated relative to one another, the bar will shift in the slot from a relaxed position to a locked position and will be supported by a portion of the slot forming surfaces while in the locked position to thereby increase the load-carrying capacity of the fastener.

With the above comments in mind, reference is had to the attached drawings.

BRIEF DESCRIPTION OF THE DRAWINGS

In the drawings:

FIG. 4 is a vertical sectional view of the fastener with the support bar in a relaxed or open position;

FIG. 5 is a vertical sectional view of the fastener taken along the plane of line 5-5 of FIG. 3 with the support bar rotated into the locked position;

FIG. 6 is a horizontal sectional view taken along the line 6-6 of FIG. 5;

FIG. 7 is a partially sectional exploded perspective view of an alternative embodiment of the fastener assembly;

FIG. 8 is a vertical sectional view thereof showing the fastener mounted on a panel;

FIG. 9 is a horizontal sectional view thereof taken along the plane of line 9-9 of FIG. 8;

FIG. 10 is a partially sectional exploded perspective view of another alternative embodiment of the fastener;

FIG. 11 is a vertical sectional view thereof with the fastener mounted on a panel; and FIG. 12 is a horizontal sectional view thereof taken along the plane of line 12-12 of FIG. 11.

DESCRIPTION OF THE PREFERRED EMBODIMENTS

Figure 1:
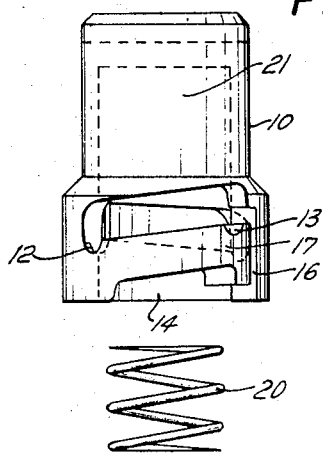
FIG. 1 is a partially sectional exploded perspective view of the fastener.
Figure 2:
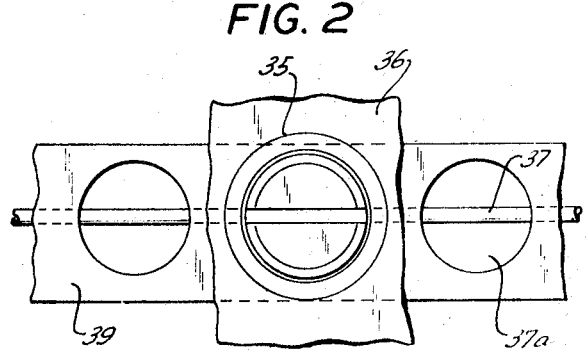
FIG. 2 is a top plan view of the fastener mounted on a panel.

In the drawings, FIGS. 1—6 show one embodiment of the fastener of this invention with FIG. 1 showing the fastener in a disassembled exploded relationship. Housing 10 is provided with a pair of diametrically opposed inclined slots 11 and 11a. The number of slots employed for a particular fastener housing is a matter of choice, for example such as one, two or four. For exemplary purposes, a fastener having two diametrically opposed slots is shown in the embodiments described herein.

Each slot is inclined upwardly around the cylindrically shaped housing 10 with respect to the transverse axis of housing 10. A notch 12 is formed in the lower end of slot 11 and a notch 13 at the upper end thereof. Similarly, respective notches 12a and 13a are formed in slot 11a.

A recess 14 is formed beneath each slot in housing 12 and is spaced from slot 11 by a strip of housing 15 having a general configuration similar to slot 11 and inclining upward in substantially parallel relationship with slot 11. The upper end of portion 15 is spaced from the remainder of housing 10 by means of vertical space 16 thereby giving portion 15 a free end 17. The lower end of portion 15 is integral with housing 10. In this manner, portion 15 acts as a cantilever bar member with its upper end portion 17 being free for movement with respect to the housing and its lower rear end portion being fixed and integral with the housing. Therefore, cantilever member or portion 15 acts similar to a cantilever spring whereby the natural resilience of the member will permit it to be displaced downward upon the application of sufficient force on the upper surface thereof. The resistance to movement of cantilever member 15 is dependent upon the strength of the material employed as well as the dimensions of portion 15. It should also be noted that recess 14 extends to a sufficient point in length so as to provide a space into which member 15 may be displaced upon exertion of a downward force thereon. Notch 13 is positioned at the upper free end of cantilever member 15 and notch 12 is positioned adjacent the lower fixed end of member 15.

A similar arrangement of recesses and surfaces forming the cantilever member is associated with notch 11a as employed with notch 11 and would similarly be employed with any additional notches positioned in housing 10.

A spring 20 is interposed between housing 10 and a stud element 30 and in circles hub 42 extending from the upper end of stud 30 when stud 30 is positioned within housing 10. An appropriate recess or chamber is located on the interior of housing 10 to receive spring 20 and the upper portion of stud member 30 including hub extension 42. A support bar 31 is mounted within transverse bore 32 of substantially cylindrical-shaped stud 30. Bar 31 is slightly larger than the diameter of stud 30 so that a small end portion of each end of bar 31 extends outwardly from the outer surface of stud 30 at approximately diametrically opposed points on the outer surface of stud 30. Support bar 31 may also be formed integrally with stud 30 so that the opposed transversely extending surfaces are merely projections on the outer surface of cylindrically shaped stud 30.

Stud element 30 is provided with a cam slot 33 at its lower end for engaging a pin 37 located in a cylindrical recess 37a which together form a receptacle in a member or panel 39. The receptacle formed by pin 37 and recess 37a in panel or member 39 is dimensioned so as to receive the forward end of stud 30.

Figure 3:
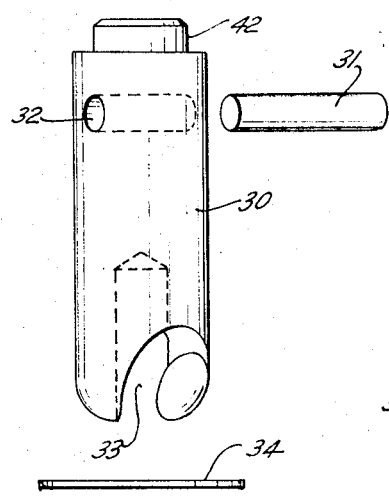
FIG. 3 is a partially sectional side elevation view thereof.
Figure 3:
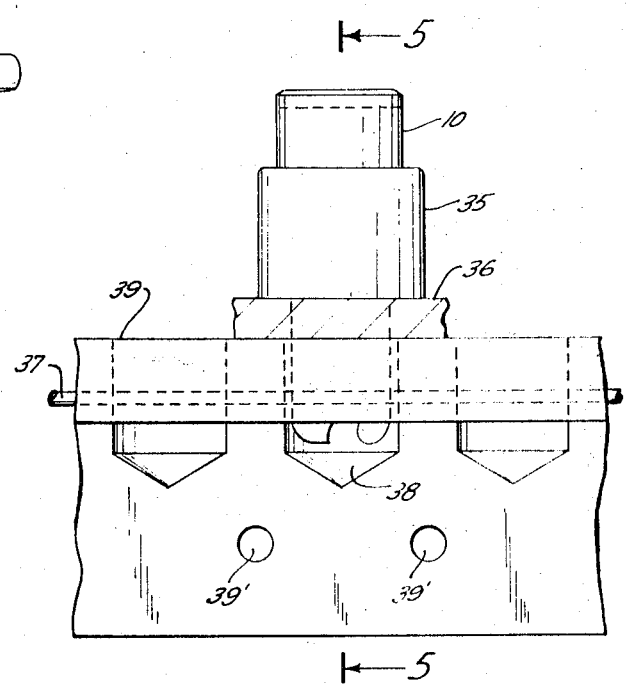
Figure 3:
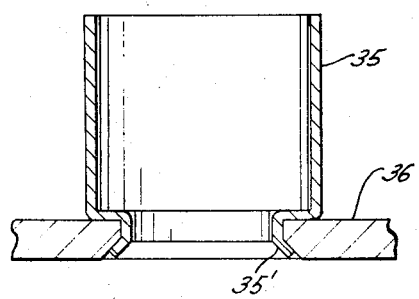

A washer 34 is positioned about stud element 30 and both are mounted in cup 35 with the lower end of stud 30 including cam surface 33 extending through an opening in the lower end of cup 35. Stud 30 extends downwardly from cup 35 through an opening in a panel or member 36 and into the receptacle in panel or member 39 where cam surface 33 engages with pin 37 at which time the fastener is in position for mounting panel 36 to panel or member 39. This is best depicted in FIG. 3 where the fastener is mounted on panel 36 with stud element 30 extending through panel 36 into the receptacle 38 with pin 37 shown in the closed position with respect to cam slot 33. As previously discussed, receptacle 38 is formed in a panel or receptacle strip 39 which in turn is mounted on a suitable support or frame (not shown). This is accomplished by any common type of fastening means such as a screw, bolt or rivet passing through openings 39' in member or receptacle strip 39 and being mounted to the suitable support or frame. Naturally, other types of common mounting means are quite acceptable for rigidly mounting strip or member 39 to the support or frame.

In regard to cup 35, as can be best seen in FIG. 1, its lower end is reduced in size and has a beveled flange thereon with the reduced portion and flange 35' engaging with corresponding surfaces surrounding the opening in panel 36 to mount cup 35 in fixed position with respect to panel 36.

FIG. 4 shows the fastener fully assembled and mounted on panel 36. As shown, each support bar 31 extends outwardly from stud element 30 and is in a relaxed or unlocked position in notch 12 at the lower end of upwardly extending inclined slot 11. It is retained and seated in notch 12 and the force exerted by spring 20 located in housing 10 assists in retaining this seated relationship. The force exerted by spring 20 is sufficient to retain the exposed end portion of bar 31 within notch 12 during assembly of the panels and the fastener with respect thereto, prior to ultimate locking of the fastener.

FIG. 5 shows the fastener assembly in locked position with panel 36 affixed to strip or member 39. To reach the position shown in FIG. 5 from the position shown in FIG. 4, the following steps are carried out. Initially, the forward end of stud 30 is positioned within receptacle 38 so that cam slot 33 engages with pin 37. Then, a tool is inserted in notch 10' on the upper surface of housing 10 and the assembly formed by housing 10 and stud 30 are then freely rotated until pin 37 reaches the closed position within cam slot 33. During this process, spring 20 assists in retaining bar 31 within notch 12 and no tension is applied at any portion of the fastener assembly or with respect to members 36 and 39.

At this point, further rotation of housing 10 and connected stud 30 will cause the projecting portion of support bar 31 to be displaced from notch 12 and shifted along the inclined surface forming the lower portion of slot 11 until it becomes seated in notch 13 at the upper end of cantilever member 15. The cantilever spring action of member 15 will facilitate the displacement of bar 31 from notch 12 and the shifting thereof along its length and its seating within notch 13. As shown in FIG. 5, the force exerted by a pin 31 as it approaches and reaches notch 13 causes a slight downward movement of member 15. During the shifting of support bar 31, it will be noted that spring 20 is slightly compressed and an upward force is exerted by the forward end portion of stud 30 on pin 37. In this manner, members 39 and 36 are drawn into tight engagement with the majority of the force required to retain the members in fixed relationship being supplied by member 15 in engagement with the undersurface of support bar 31. In this manner, it can be seen how the strength of the individual fastener employed is dependent upon the strength of cantilever member 15. Naturally, this strength factor may be controlled by the dimensions of member 15 and the strength of the housing material employed which would also be the material of member 15 since it is integral at its lower end with housing 10. Naturally, it would also be acceptable to independently form member 15 and then mount it in a convenient manner to housing 10.

To release the fastener, all that is required is a counter rotation of housing 10 and stud 30 with sufficient force applied to displace bar 31 from notch 13 and rotate it down into its initial relaxed or unlocked position in notch 12. Once again, the resilient cantilever action of member 15 facilitates this shifting of bar 31 from notch 13 to notch 12. Continued rotation in the same direction of housing 10 and stud 30 will cause cam slot 33 to become disengaged with pin 37 once again thereby permitting members 39 and 36 to become disengaged.

It should be kept in mind that since each projection extending from stud 30 as exemplified by the outwardly extending ends of support bar 31 is similarly mounted in a slot as represented by slots 11 and 11a and the rotating action to accomplish the fastening means of this structure will cause simultaneous shifting of each projection from the respective notches 12 and 12a to the locked position in respective notches 13 and 13a. The additional projections and corresponding slots and cantilever members providing additional support for the fastener means to facilitate the provision of a fastener having an increased load-carrying capacity. It can be readily seen that by having the fastening load supported by the housing wall rather than merely a spring such as spring 20 utilized in previous fastening devices, a much stronger fastener is present.

FIGS. 7 through 9 show an alternative embodiment of the invention which provides an even more rigid fastened interengagement between the two members. All elements of this second embodiment are substantially identical to the elements of the first embodiment with the exception of the housing 10' of the fastener assembly and the washer 34' which is positioned on the stud 30 adjacent the lower end of the housing 10'.

The difference in the housing lies in the shape and configuration of the inclined slots 14'. The function of the slots 14' is similar to the function of the slots 11 in the first embodiment, however, slots 14' have a series of serrations 15', 16', 17', 18', and 19' along its upper and lower surfaces. The lower serration 15' and the upper serration 19' are similar to the notches 12 and 13 in the previous embodiment in the sense that they maintain the end of support bar 31 positioned therein in the normally open or closed position for the fastener assembly. Once again, spring 20 is provided to retain support bar 31 in serration or notch 15' during the initial fastening operation as discussed above.

The serrations are present due to the use of this type of fastener with different thicknesses of panels and members to be fastened together. When thicker panels are being fastened, the fastener may lock at an intermediate position between notch 15' and 19' while when the panels being fastened are thinner, it may be required to rotate housing 10' to its fullest extent until bar 31 is seated in serration or notch 19'. In this manner, the fastener having a housing 10' is adaptable for use with a variety of different thickness panels.

Since a spring action is not present which would be similar to the cantilever member 15 in the previously discussed embodiment, the fastener disclosed in the embodiment shown in FIGS. 7—9 is a substantially rigid fastener. However, there is a slight spring action present in the assembly which is produced by deformation of pin 37 when the locking engagement is arrived at and by the fact that washer 34' is initially curved in configuration so that when the fastener is moved to the locked position the curved washer will be deformed to a substantially flat configuration thereby providing a slight deformation and resultant spring action which in combination with the deformation and spring action of pin 37 serve to resiliently react to tightening of the fastener and assist in taking up part of the load when members 36 and 39 are locked together.

The steps in operating the fastener are identical to the steps discussed in relation to the previously disclosed embodiment and need not be amplified at this time. However, it should be mentioned that when the fastener is disengaged the deformed washer 34' will substantially return to its initial configuration as will pin 37.

A third embodiment is disclosed in FIGS. 10—12 and is substantially equivalent to the embodiment of FIGS. 7—9 with the exception that spring 20 is not utilized and spring clips 40 are employed to retain bar 31 in notch 15 when the fastener is in the relaxed or unlocked position. A spring clip 40 is employed for each notch 15 which in the disclosed embodiments would number two since two diametrically opposed inclined slots are shown. In this manner, spring clip 40 serves the function that spring 20 serves in the previously discussed two embodiments in that it assists in retaining bar 31 in detent 15 during the initial stages of the fastening process. Consequently, in any of the embodiments discussed herein, spring clips 40 may be substituted for spring 20 and a working embodiment would be present. In all other respects, the embodiment of FIGS. 10—12 is operated the same as and is structurally similar to the embodiment of FIGS. 7—9.

Finally, it should be kept in mind that the second and third embodiments as exemplified by FIGS. 7—9 and 10—12 respectively, the upper slot wall need not be serrated and can be produced with a uniform surface without detracting from the load-carrying capacity of those particular embodiments.

In general, as support bar 31 shifts between the relaxed and locked position in all of the embodiments of the invention, it urges stud element 30 upward and thus increases the upward force or tension exerted on pin 37. The increased tension on pin 37 is borne by the housing wall bearing upward against support bar 31. This design permits the load-carrying capacity of the fastener to be limited only by the weakest part of the assembly which in the first embodiment would be cantilever member 15 as previously discussed and in the remaining two embodiments would be the weakest part of the stud. In regard to the second and third embodiments discussed above, the load capacity of the fastener will be about 400 pounds. With respect to the cantilever arrangement of the first embodiment, the fastener will still have a considerably increased load-carrying capacity over the load-carrying capacity of previously used fasteners of this type where a spring such as spring 20 would carry the load and would generally not carry a load much over 15 pounds. Furthermore, because of the increased rigidity of the fastening engagement, less play will occur between the fastened members and consequently, excessive wear will be reduced about the panel opening through which the cup is inserted when the assembly is exposed to a large amount of vibration, particularly over lengthy periods of time.

Thus, the above mentioned objects and advantages of the invention are effectively attained.

I claim:

1. A fastener for substantially rigidly interengaging two members comprising:
    a stud element adapted to extend through an opening in one of said members and having a cam slot adapted to engage a pin on the other of said members;
    said stud element being rotatable between an open and closed position on the pin;
    a housing surrounding the upper part of the stud element in rotatable relationship therewith and being positioned on one side of the surface of said one member distal from said other member when said cam slot is engaged with the pin;
    said housing having surfaces thereon forming a slot in the wall thereof inclined with respect to the transverse axis of the housing;
    a bar extending laterally from the stud element through the slot and engaging the slot forming surfaces of said housing; and
    means for retaining the bar in the slot so that when the pin is in the closed position in the cam slot and the housing or stud are rotated relative to one another, the bar will shift in the slot from a relaxed position to a locked position and will be supported by a portion of said slot forming surfaces while in the locked position to thereby increase the load-carrying capacity of the fastener.

2. The invention in accordance with claim 1 wherein the inner, upper surface of said housing is spaced from the upper end of said stud to thereby form a chamber therebetween, a spring in said chamber and being compressed a predetermined amount so as to bear against the upper surface of said stud and facilitate the retention of said bar in the relaxed position in said slot.

3. The invention in accordance with claim 1 wherein a cup surrounds the housing and stud assembly.

4. The invention in accordance with claim 1 wherein the portion of said housing beneath the slot and forming the lower surface of said slot substantially conforms to the configuration and attitude of said slot and is disengaged at the upper end thereof from the remainder of said housing to form a cantilever element, said cantilever element spaced from the members to be fastened and responsive to rotation between the stud and the housing to facilitate movement of the bar between the relaxed and locked positions while retaining the increased load-carrying capacity of the fastener.

5. The invention in accordance with claim 1 wherein the means for retaining the bar in position includes notches formed in the housing wall and located at the upper and lower ends of the inclined slot to seat the bar.

6. The invention in accordance with claim 1 wherein means are included for retaining the bar in position at intermediate positions along the inclined slot.

7. The invention in accordance with claim 6 wherein the means for retaining the bar includes a plurality of serrations extending from a lower end of the inclined slot to the upper end thereof to permit the seating of the bar in intermediate retention positions in the inclined slot.

8. The invention in accordance with claim 7 wherein a washer is provided between the bottom surface of the housing and said one member, said washer being resilient and arcuate in normal configuration and being responsive to rotation between the stud and housing to facilitate movement of the bar between the relaxed and locked positions while retaining the increased load-carrying capacity of the fastener.

9. The invention in accordance with claim 1 wherein a locking mount is positioned on the housing for seating the bar in the relaxed position.

10. The invention in accordance with claim 2 wherein a hub extends from the stud element about which the spring and housing are positioned.

11. The invention in accordance with claim 1 wherein said housing includes a pair of diametrically opposed slots with each slot having a bar positioned therein, said bars being simultaneously transferred between the relaxed and locked positions upon relative rotation between said stud and said housing.